United States Patent
De Wilde et al.

(10) Patent No.: US 11,714,199 B2
(45) Date of Patent: Aug. 1, 2023

(54) SYSTEM AND METHOD FOR DETECTING SPOOFING OF GNSS SIGNALS

(71) Applicant: Septentrio N.V., Heverlee (BE)

(72) Inventors: Wim De Wilde, Oud-Heverlee (BE); Jean-Marie Sleewaegen, Jette (BE)

(73) Assignee: Septentrio N.V., Heverlee (BE)

( * ) Notice: Subject to any disclaimer, the term of this patent is extended or adjusted under 35 U.S.C. 154(b) by 220 days.

(21) Appl. No.: 17/276,769

(22) PCT Filed: Sep. 21, 2019

(86) PCT No.: PCT/EP2019/075437
§ 371 (c)(1),
(2) Date: Mar. 16, 2021

(87) PCT Pub. No.: WO2020/058521
PCT Pub. Date: Mar. 26, 2020

(65) Prior Publication Data
US 2022/0050213 A1    Feb. 17, 2022

(30) Foreign Application Priority Data
Sep. 21, 2018   (EP) ..................................... 18196108

(51) Int. Cl.
*G01S 19/21* (2010.01)
*G01S 19/36* (2010.01)

(52) U.S. Cl.
CPC ............ *G01S 19/215* (2013.01); *G01S 19/36* (2013.01)

(58) Field of Classification Search
CPC ............................... G01S 19/215; G01S 19/36
See application file for complete search history.

(56) References Cited

U.S. PATENT DOCUMENTS 7,310,062 B1 * 12/2007 Hwang ................. G01S 19/215
                                                    342/357.59

FOREIGN PATENT DOCUMENTS

EP       2746813 A1   6/2014

OTHER PUBLICATIONS

Emily Mcmilin et al., "Single Antenna GPS Spoof Detection that is Simple, Static, Instantaneous and Backwards Compatible for Aerial Applications," Proceedings of the 27th International Technical Meeting of the ION Satellite Division, ION GNSS+ 2014, Tampa, Florida, Sep. 8-12, 2014.

(Continued)

*Primary Examiner* — Cassi J Galt (57) ABSTRACT

The invention pertains to a method for operating a GNSS receiver in the presence of spoofed signals, the GNSS receiver having a plurality of satellite signal receive chains with a low associated antenna envelope correlation coefficient, the method comprising: receiving signals from said plurality of satellite signal receive chains; obtaining (1010) relative amplitude and phase values of respective signals as provided by a pair of satellite signal receive chains from among said plurality of satellite signal receive chains; clustering (1020) said received signals on the basis of said monitored relative amplitude and phase values; and asserting (1040) a spoofing detection state when said clustering reveals a cluster of signals exhibiting similar relative amplitude and phase values over a predetermined time frame (1030). The invention also pertains to a GNSS receiver.

19 Claims, 10 Drawing Sheets

(56) References Cited

OTHER PUBLICATIONS

Extended European Search Report from European Patent Application No. 18196108.7 (filed Sep. 21, 2018) dated Apr. 11, 2019.
International Search Report and Written Opinion from PCT Application No. PCT/EP2019/075437 (filed Sep. 21, 2019), dated Jan. 7, 2020.
Matthew Trinkle et al., "GPS Anti-Spoofing Techniques for Smart Grid Applications," 25th International Technical Meeting of the Satellite Division of The Institute of Navigation, Nashville TN, Sep. 17-21, 2012.

* cited by examiner

SYSTEM AND METHOD FOR DETECTING SPOOFING OF GNSS SIGNALS

FIELD OF THE INVENTION

The present invention pertains to Global Navigation Satellite Systems (GNSS), and in particular to systems and methods for the detection of attacks that rely on the injection of spoofed satellite signals to maliciously cause GNSS receivers to derive and report incorrect position information.

BACKGROUND

Global Navigation Satellite Systems (GNSS) synchronously transmit pseudo-random sequences from each satellite in the system. These are received with a time delay, which is specific for each satellite and related to the distance between the satellite and the user. A user's GNSS receiver uses the time delay along with the broadcasted satellite position to calculate the location of the user and to provide the user with an absolute time reference.

When an attacker injects spoofed signals into the receiver's antenna with a faulty timing, e.g. by using a GNSS constellation simulator connected to an amplifier and a transmit antenna or by replaying previously recorded satellite signals, the receiver can be made to derive and report incorrect position information. The reported user position and time can be offset from reality to any position or time according to the wishes of the attacker.

As the legitimate satellite signals have to travel a long distance to reach the receiver and are greatly attenuated in the process, the signals required to launch a spoofing attack from an evidently much shorter distance do not have to be very strong. The spoofed signals only need to be slightly higher than the authentic signals to introduce the desired erroneous perceived delay. It has been shown that a transmit power of just 1 mW can be sufficient for overpowering the satellite signals from a distance in the order of 1 km if the receiver is in line-of-sight from the transmitter. Existing anti-spoofing methods rely on a limited number of techniques.

A first class of methods exploits the spatial signature of the spoofing signal, relying on the fact that the spoofing signal and its underlying signal components come from a particular direction, different from the authentic satellites. In this context, the use of an antenna array with a known orientation in a system with known hardware phase delays to measure the direction of arrival of signals can help to discriminate between legitimate and spoofed signals. For example, U.S. Pat. No. 7,250,903 B1, entitled "GPS spoofer and repeater mitigation system using digital spatial nulling", discloses a system and method using a multi-element digital beamformer for detection and mitigation of spoofer and repeater threats to GPS that would not be addressed by baseline signal-to-noise (SNR) maximization algorithms. GPS correlators and processing are applied to multiple beam outputs to detect and locate spoofer and repeater threats. In the beamformer processing, detected threats can be spatially nulled, even in the presence of traditional high power jamming, by modifying the normal sample covariance matrix to introduce synthetic nulls. A digital complex weighting system multiples each input channel by a complex (gain/phase) weight and adds the weighted channels together to form beams that the GPS receiver can use to reacquire the satellites in use without knowledge of platform attitude or the antenna manifold.

To avoid the requirement of having a known array orientation, some methods resort to computing the eigenvalues of the post-correlation array outputs and assessing if one value is significantly larger than the other ones, as proposed in a recent paper by Broumandan et al., "GNSS Spoofing Detection in Covered Spoofing Attack Using Antenna Array", *International Technical Symposium on Navigation and Timing (ATSNT)* 2017. However, this only works well if the tracked signals are all spoofed signals, in a so-called covered attack in which the authentic signal has been blocked. Such methods only provide an indication to the user that spoofing is present and the position should not be trusted.

These array-based methods use multiple physical antenna elements and hence result in large and complex solutions. Other spatial methods can operate with a single element.

For example, U.S. Pat. No. 8,340,588 B2, entitled "Handheld synthetic antenna array", discloses a system for estimating parameters of an incoming signal. At least one antenna is coupled to at least one suitable receiver. The antenna(s) are spatially translated in an arbitrary trajectory. As the antenna(s) is being spatially translated, a data processing means samples the incoming signal at set intervals based on a clock signal provided by a system clock. By sampling the incoming signal at different times at different spatial locations on the arbitrary trajectory, the system acts as a synthetic antenna array. The different samplings of the incoming signal at different times and positions provide signal diversity gain as well as different readings which can be used to estimate and/or calculate various parameters of the incoming signal. The different samplings can be used to detect the incoming signal, estimate its angle of arrival, estimate its time of arrival, as well as other parameters. It should be noted that this method requires the receiver to move relative to the spoofer antenna.

Other single-element methods use an element arranged to output signals corresponding to two polarizations. One output of this dual polarized antenna could correspond to the right hand circular polarization of the electromagnetic wave (RHCP), while the other one could represent left hand circular polarization (LHCP). The dual polarized approach is attractive as an LHCP output can generally be made available with minor manipulations in the antenna electronics without affecting the antenna size and performance. A method discussed in Emily McMilin, "Single Antenna GPS Spoof Detection that is Simple, Static, Instantaneous and Backwards Compatible for Aerial Applications", *Proceedings of the 27th International Technical Meeting of the Satellite Division of the Institute of Navigation (ION GNSS+ 2014)*, Tampa (Fla.) September 2014, pp. 2233-2242, switches between RHCP and LHCP output and measures the difference in signal strength, exploiting the fact that a spoofer operating from negative elevation would show a much lower signal strength difference than authentic signals from high elevation. The method of international patent application no. WO 2016/085554 A2, entitled "Spoofing detection and anti-jam mitigation for GPS antennas", uses a ground plane to convert the polarization of any signal coming from ground level or below into a linear polarization and then combines the RHCP and LHCP antenna outputs with a variable phase shift to determine the presence of the spoofing signal and its angle of arrival. This method is constrained by the need of a large ground plane and an analog phase shifter and is restricted to spoofing signals from low elevation.

In addition to the above mentioned drawbacks of the existing methods, they don't allow identification of the subset of satellites that are spoofed. In many scenarios the attacker does not have physical access to the antenna and will try to manipulate the perceived position by injecting a spoofed signal while the authentic signal is still present. In order to avoid obvious signal power-based detection methods, the attacker will adjust the spoofing power to be only marginally larger than the authentic signal. Typically, a spoofing attack will follow a short period of jamming, intended to unlock the tracking loops. When the jamming is gone, a receiver will often acquire a mix of spoofed and authentic signals. This would also occur if the spoofer only mimics a sub-set of the available authentic signals.

The article by Matthew Trinkle et al., "GPS Anti-Spoofing Techniques for Smart Grid Applications", *Proceedings of the 25th International Technical Meeting of the Satellite Division of the Institute of Navigation*, 2012, pp. 1270-1278, proposes a simple anti-spoofing technique applicable to timing receivers in smart grid applications. The likelihood of spoofing at each timing receiver is determined based on the direction of arrival (DOA) of the GPS signals. If they all come from one direction a spoofer is deemed more likely. The DOA of the spoofer is determined from the power ratio of the GPS signals on two antennas with dissimilar radiation patterns. An overall framework that applies to a network of PMUs is also introduced which combines GPS anti-spoofing techniques in the physical layer within each PMU with a trustworthiness framework in the signal processing layer.

European patent application publication no. EP 2 746 813 A1 in the name of Astrium GmbH, relates to a method for detecting spoofing of GNSS navigation signals comprising the acts of: receiving navigation signals from a first GNSS satellite and from a second GNSS satellite with a first antenna and a first receiver; receiving navigation signals from the first GNSS satellite and from the second GNSS satellite with a second antenna and a second receiver; measuring carrier phase differences of the received navigation signals; calculating phase double differences from the measured carrier phase differences; calculating a test statistic from all calculated phase double differences; checking whether the test statistic remains in a range defined by two thresholds over a predefined time period; and detecting spoofing if the test statistic remains in the range defined by the two thresholds during the predefined time period.

Accordingly, there is still a need for better detection of GNSS spoofing attacks.

SUMMARY

According to an aspect of the present invention, there is provided a method for operating a GNSS receiver in the presence of spoofed signals, the GNSS receiver having a plurality of satellite signal receive chains with a low associated antenna envelope correlation coefficient, the method comprising: receiving signals from the plurality of satellite signal receive chains; obtaining relative amplitude and phase values of respective signals as provided by a pair of satellite signal receive chains as the amplitude and phase of one receive chain relative to another from among the plurality of satellite signal receive chains; clustering the received signals on the basis of the monitored relative amplitude and phase values; and asserting a spoofing detection state when the clustering reveals a cluster of signals exhibiting similar relative amplitude and phase values over a predetermined time frame.

The term "receive chain", as used herein, refers to a circuit that extracts amplitude, code delay and phase information from a plurality of satellite signals as available on a single RF input. It contains a plurality of despreader channels. It is important to avoid confusion: some engineers would call each combination of a demodulator with a particular despreader channel a receive chain. It is particularly noted that while there are several demodulation channels in a GPS receiver after the demodulator (one per satellite signal), the term "receive chain" is not meant to designate those individual demodulation channels. Accordingly, a "receive chain" as used herein contains a multitude of despreading channels of GNSS signals".

The present invention is based inter alia on the insight of the inventors that the antenna outputs in a system with multiple receive chains will show a relative phase and amplitude variation which strongly depends on the polarization and direction of arrival of the signal of interest. The present invention is further based on the observation that naturally occurring relative phase-amplitude clusters of authentic signals normally don't last for a long time, due to the satellites' movements, such that the detection of a lasting cluster in the phase-amplitude space is indicative of the presence of spoofed signals. By combining these insights, the inventors have surprisingly found that it is possible to use a system with multiple receive chains with a low envelope correlation coefficient to distinguish signals whose phase and amplitude signature are characteristic of an authentic satellite-to-earth transmission from signals that are likely spoofed.

In an embodiment, the method according to the present invention further comprises providing a signal to an end user when the spoofing detection state is asserted.

It is an advantage of this embodiment that the end user of the GNSS receiver can assess whether the position and/or timing reference provided by the system should be trusted for the end user's purposes.

In an embodiment, the method according to the present invention further comprises performing a position determination on the basis of the received signals, whereby signals belonging to the cluster of signals exhibiting similar relative amplitude and phase values over a predetermined time frame are excluded.

It is an advantage of this embodiment that it allows the GNSS receiver to provide an accurate position and/or timing reference despite the presence of spoofed signals.

In an embodiment of the method according to the present invention, the pair of satellite signal receive chains processes two orthogonal polarizations captured by a shared antenna element.

This embodiment allows for a very compact implementation of the method according to the invention, as it avoids the need for a second physical antenna. This embodiment is inter alia based on the further insight of the inventors that while the authentic GNSS signals are initially transmitted with an RHCP polarization, the received signals will include a satellite-specific LHCP component caused by reflections in the environment, generally having phase and amplitude characteristics that are very different from the RHCP component.

In an embodiment of the method according to the present invention, a first one of the pair of satellite signal receive chains processes a signal captured by a regular hemispherical right-hand circularly polarized antenna element, and wherein a second one of the pair of satellite signal receive chains processes a signal captured by a linear antenna element.

The inventors have found that this embodiment provides for particularly reliable detection of spoofed signals.

In a particular embodiment, the linear antenna element is mounted underneath the circularly polarized antenna element.

This particular embodiment allows for a very compact implementation of the method according to the invention.

In an embodiment of the method according to the present invention, respective corresponding signals in the pair of satellite signal receive chains are despreaded with a common local code and carrier signal, using a filtered version of the despreading results of one or both signals to feedback the local signal timing.

It is an advantage of this embodiment that it reuses one or more dispreading results as a signal timing feedback signal for the despreading of both signals of the pair. It will be understood that this approach is not limited to operating an individual signal pair, but can be applied to a multitude of signals. This embodiment is based on the insight that an appropriate feedback signal can be obtained on the basis of a filtered version of the despreading results of one or multiple chains. For example, the RHCP correlation results may be used to feedback both the RHCP and LHCP channels in a dual polarization embodiment. In other approaches (e.g. when using two inverted F antennas), it correlation results of multiple channels may be combined to advantageously enhance tracking.

In an embodiment, the method according to the present invention further comprises excluding from the clustering any signals whose relative amplitude ratio exceeds a predetermined threshold.

It is an advantage of this embodiment that it provides a very simple yet effective criterion for avoiding false association of a particular signal with a tentative cluster.

In an embodiment, the method according to the present invention further comprises producing a signal devoid of a spoofed component by performing the following steps on a first signal as provided by a first one of the pair of satellite signal receive chains and a second signal as provided by a second one of the pair of satellite signal receive chains, corresponding to the first signal: scaling the first signal with a relative amplitude corresponding to a point within a cluster that represents spoofed signals as detected in said asserting steps; rotating the scaled first signal with a relative phase corresponding to said point within the cluster; and subtracting the scaled and rotated first signal from the second signal.

It is an advantage of this embodiment that further processing can proceed in a standard manner, on the basis of a pair of corresponding signals (from different receive chains) that has first been "cleaned" of the spoofed signals. Use is made of relative phase and scale information obtained from the cluster representing spoofed signals, as detected by the method as described above, in particular a cluster giving rise to the assertion of a "spoofing detection state". The point within the cluster may be a judiciously chosen function of all the measurement pairs represented by said cluster, such as—without limitation—an "average" obtained by a suitable averaging metric. The skilled reader will understand that the scaling and rotating steps may be carried out in arbitrary order, without changing the outcome of the operation.

According to an aspect of the present invention, there is provided a GNSS receiver comprising a plurality of satellite signal receive chains with a low antenna envelope correlation coefficient, and processing means operatively connected to the satellite signal receive chains, the processing means being configured to: receive signals from the plurality of satellite signal receive chains; obtain relative amplitude and phase values of respective signals as provided by a pair of satellite signal receive chains as the amplitude and phase of one receive chain relative to another from among the plurality of satellite signal receive chains; cluster the received signals on the basis of the monitored relative amplitude and phase values; and assert a spoofing detection state when the clustering reveals a cluster of signals exhibiting similar relative amplitude and phase values over a predetermined time frame.

In an embodiment, the GNSS receiver according to the present invention is further adapted to provide a signal to an end user when the spoofing detection state is asserted.

In an embodiment of the GNSS receiver according to the present invention, the processing means if further configured to perform a position determination on the basis of the received signals, whereby signals belonging to the cluster of signals exhibiting similar relative amplitude and phase values over a predetermined time frame are excluded.

In an embodiment, the GNSS receiver according to the present invention further comprises a shared antenna element, and the pair of satellite signal receive chains is configured to process two orthogonal polarizations captured by the shared antenna element.

In an embodiment, the GNSS receiver according to the present invention further comprises a regular hemispherical right-hand circularly polarized antenna element and a linear antenna element; a first one of the pair of satellite signal receive chains is configured to process a signal captured by the regular hemispherical right-hand circularly polarized antenna element, and wherein a second one of the pair of satellite signal receive chains is configured to process a signal captured by the linear antenna element.

In a particular embodiment, the linear antenna element is mounted underneath the circularly polarized antenna element.

According to an aspect of the present invention, there is provided a computer program product comprising code means configured to cause a GNSS receiver as described above, when executed in a processor of said GNSS receiver, to perform the steps of the method described above.

The technical effects and advantages of embodiments of the computer program product and the GNSS receiver according to the present invention correspond, mutatis mutandis, to those of the corresponding embodiments of the method according to the present invention.

BRIEF DESCRIPTION OF THE FIGURES

These and other technical features and advantages of embodiments of the present invention will now be described in more detail with reference to the accompanying drawings, in which.

DETAILED DESCRIPTION OF EMBODIMENTS

Figure 1:
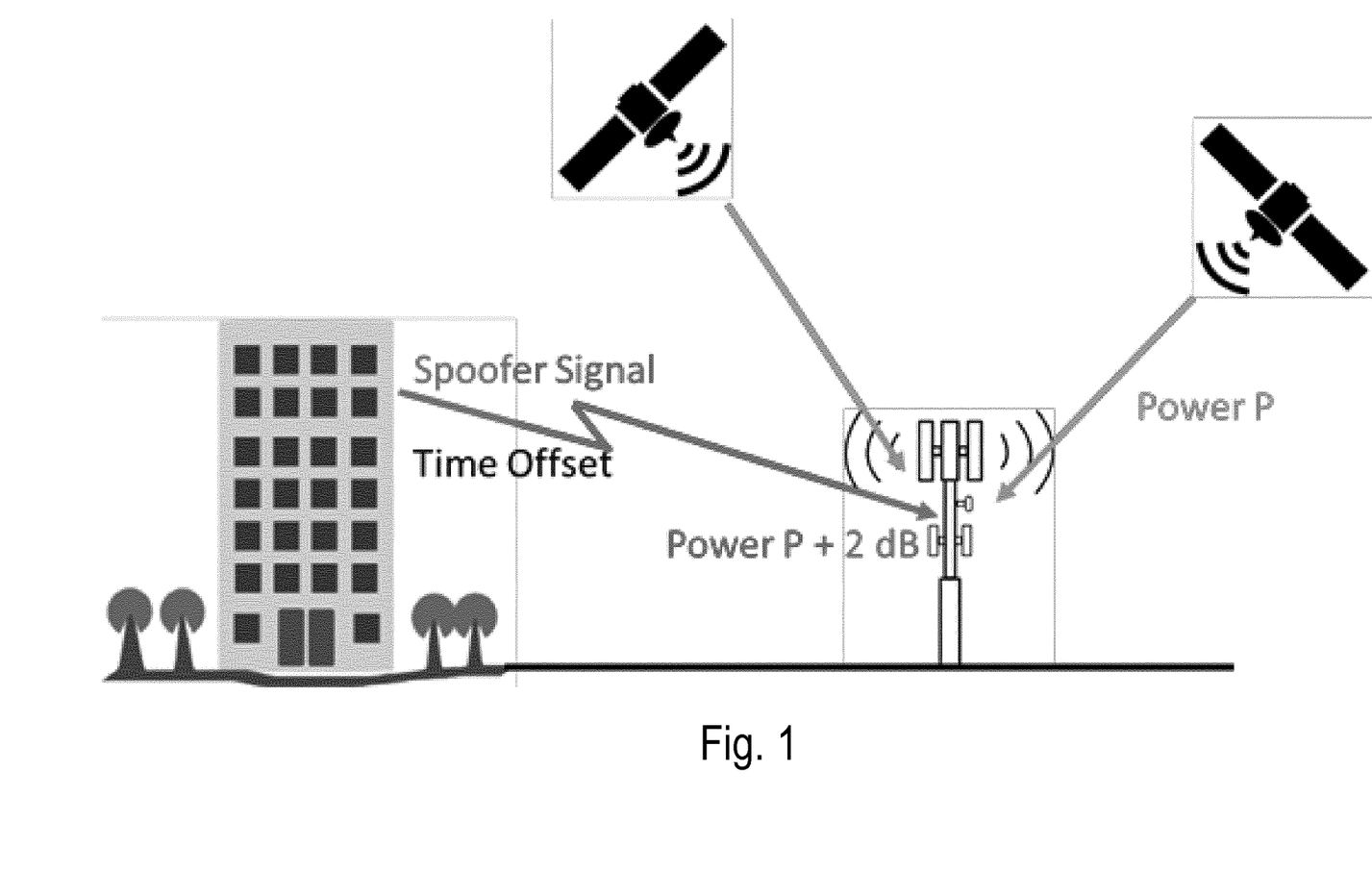
FIG. 1 schematically illustrates a set-up for a spoofing attack on a base station of a cellular network.

Spoofing attacks are a major concern in a military context, but also in many civil applications. Critical infrastructure like the power grid and the cellular network rely on GNSS for their timing. These applications are particularly vulnerable as they are static with respect to the spoofing antenna, which makes it relatively easy to set up an attack. FIG. 1 schematically illustrates a set-up for a spoofing attack on a base station of a cellular network.

This also holds for GNSS-based ankle monitors and road tolling devices, in which case the user can even completely block the authentic GNSS signals and inject a signal representing a favorable position.

Figure 3:
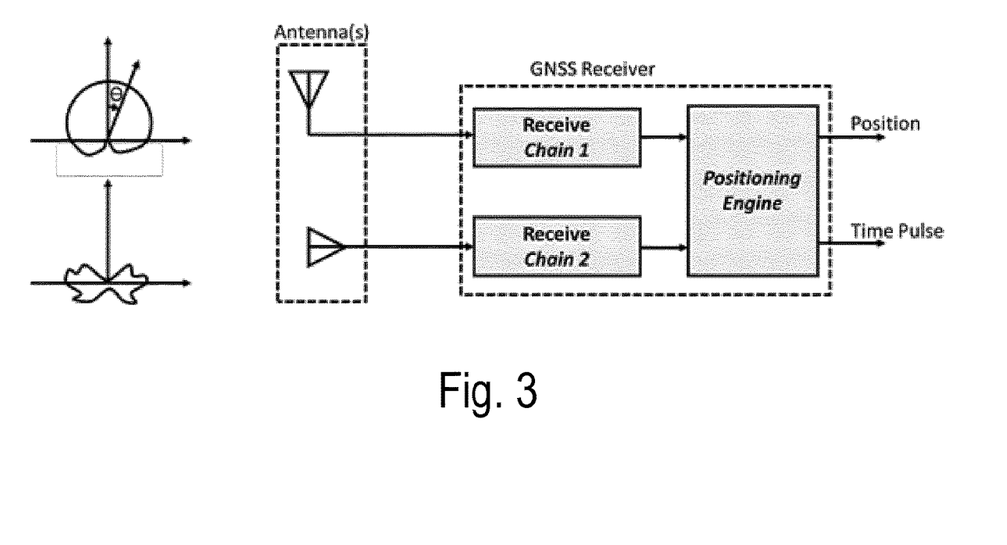
FIG. 3 provides a block diagram of a two-input receiver, and schematically illustrates the corresponding antenna responses on GNSS signals as a function of direction of arrival of the GNSS signal.

Embodiments of the present invention mitigate spoofing attacks by using a receiver that connects to at least two antenna outputs having a weak envelope correlation coefficient (ECC), as schematically illustrated in FIG. 3. The "envelope correlation coefficient", as used in the art and in this application, is a measure for how dependent two antennas' radiation patterns are. A mathematical expression of the ECC can be found in the relevant literature, including the website www.antenna-theory.com (www.antenna-theory.com/definitions/envelope-correlation-coefficient-ecc.php).

For the sake of clarity, the remainder of this description will assume that exactly two antenna outputs are available, but the skilled person will understand that this is done without loss of generality, and that the invention equally applies where a greater number of antenna outputs is available, two of which are used for the processing as described herein.

The two antenna outputs could originate from two individual (physical) antenna elements or from single antenna element outputting two polarizations.

Figure 4:
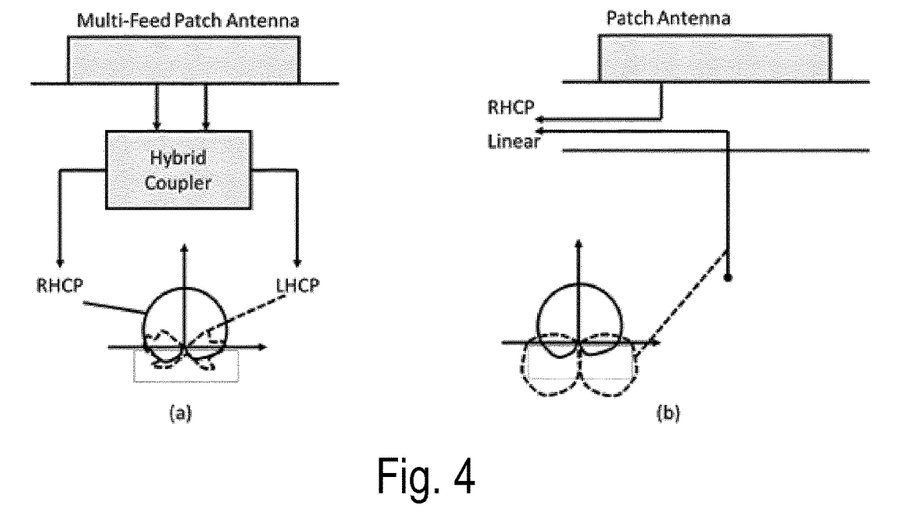
FIG. 4 illustrates example antenna designs and antenna responses as a function of direction of arrival of the GNSS signal.

In the embodiment schematically illustrated in FIG. 4a, one of the antennas has the hemispherical, predominantly RHCP polarized pattern characteristic for most GNSS antennas with good performance, while the other element is the LHCP output of the same element, in a so-called dual polarized antenna.

Alternatively, the second antenna element could be a separate antenna with linear polarization, another directivity or both. In particular, in the embodiment schematically illustrated in FIG. 4b, the second antenna is a linear stub antenna placed in a way in which it doesn't impact the performance of the RHCP antenna.

The antenna outputs will show a relative phase and amplitude variation which strongly depends on the polarization and direction of arrival of the signal of interest. For a dual polarized antenna, the phase difference between the outputs depends on the direction of arrival, while the amplitude ratio depends on many factors. The authentic GNSS signals are initially transmitted with an RHCP polarization. However, the signals get reflected by the environment, resulting in a satellite-specific LHCP component, generally with phase and amplitude characteristics that are very different from the RHCP component. Even in absence of multipath, the LHCP branch of the antenna will have an erratic response on pure RHCP signal because of antenna non-idealities and will hence also generate a signal with different phase and amplitude.

In a design which combines an RHCP antenna with a linear stub or chip antenna, the linear antenna will have a very different radiation pattern. A linear stub antenna will have a notch towards vertical directions and maximal response near the horizon. Its phase output does not depend on the angle of arrival, as opposed to the RHCP element. Linear chip antennas or inverted-F antennas could also be used. These antennas show a radiation pattern with large and non-systematic amplitude fluctuations as function of the direction of arrival.

The two antenna outputs connect to two receive chains, arranged to monitor amplitude and phase of the underlying satellite signals in the input signal. Each chain could have a specific phase and amplitude bias due to hardware imperfections, which may even be time variant.

Figure 2:
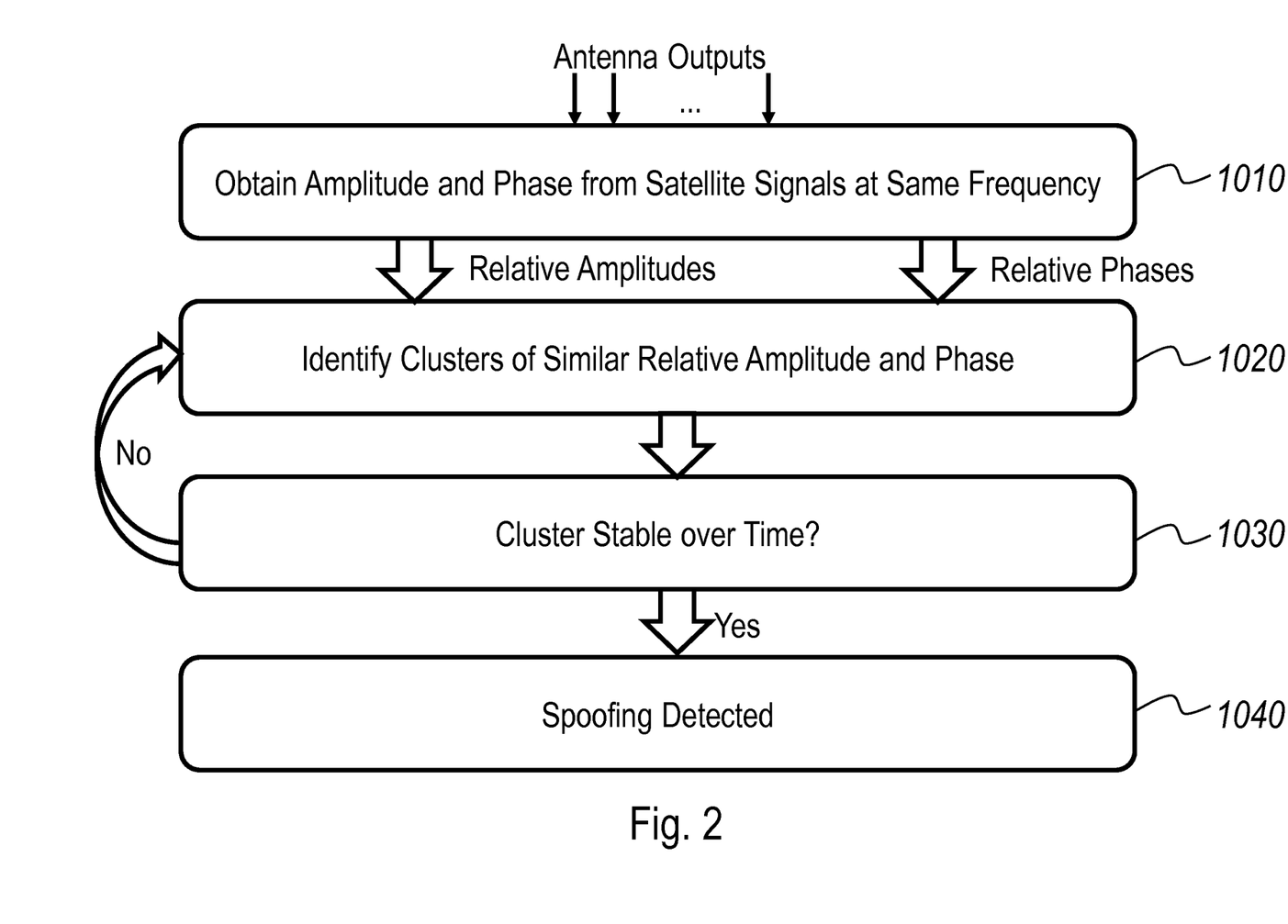
FIG. 2 provides a flow chart of an embodiment of the method according to the present invention.

FIG. 2 provides a flow chart of an embodiment of the method according to the present invention. In the illustrated embodiment, the method operates a GNSS receiver in the presence of spoofed signals, by:

receiving signals from said plurality of satellite signal receive chains;

obtaining 1010 relative amplitude and phase values of respective signals as provided by a pair of satellite signal receive chains from among said plurality of satellite signal receive chains;

clustering 1020 said received signals on the basis of said monitored relative amplitude and phase values; and asserting 1040 a spoofing detection state when said clustering reveals a cluster of signals exhibiting similar relative amplitude and phase values over a predetermined time frame 1030.

According to the principles of the invention, if both the relative amplitude and relative phase of both receive chains of the signals in a group of signals are sufficiently close together during an extended time frame, these signals are unlikely to originate from a legitimate satellite-borne source, and should be considered as spoofed.

In embodiments of the present invention, a group of signals may be considered "sufficiently close together" and identified as a cluster, if the relative phases after a 1 second coherent integration time are contained in a 30° range and relative amplitudes in a 3 dB range. In embodiments of the present invention, the predetermined amount of time, during which this proximity must subsist in order to be considered a likely spoofing attempt (i.e. the threshold time), may be 50 s if the group contains at least 4 satellites, shorter times (e.g. threshold values in the range between 1 s and 50 s) or longer times (e.g. threshold values in the range between 50 s and 300 s) may be used, depending on the cardinality of the group of signals, the user environment and user's requirement with respect to the avoidance of false positives and the avoidance of false negatives.

According to the invention, the presence of spoofed signals is asserted as a "spoofing detection state". This assertion can be used as appropriate by the further processing steps (in software or in hardware), e.g. by providing a signal to the end user (e.g. an auditory or visual signal), or by generating a position and timing output on the basis of a group of signals from which the suspicious signals have been discarded.

A particular way of providing a "clean" position and timing output in the presence of spoofed signals, is to mathematically remove the spoofed component from the signal to be used by the positioning algorithm. The signal from one receive chain could be scaled and rotated according to the relative amplitude and phase of the identified spoofing signal and subtracted from the other receive chain (preferably RHCP), to generate a signal which does no longer contain the spoofing signal. This signal can be used to acquire and track the underlying authentic signal. This operation can be done at different levels in the signal chain, e.g. at the input of the tracking channel or after correlation with a local signal, as this is a linear operation.

This approach avoids the inherently large size of phase-based methods with multiple elements at different locations as in U.S. Pat. No. 7,250,903 B1, cited above, and allows for a symmetrical antenna design without coupling issues which degrade the performance of the hemispherical RHCP element. The use of purposefully decorrelated antenna patterns, causes a significant amplitude variation as function of spoofer EM field direction and polarization, next to a phase variation. This two-dimensional quantity causes a better detection sensitivity compared to essentially phase based methods as used in the prior art. Embodiments of the invention discard satellites from the positioning solution rather than applying a null-steering as in U.S. Pat. No. 7,250,903 B1. This avoids degeneration of the phase center of non-spoofed signals. The method according to the invention does not require the receiver to move and could hence be used in applications in which the receiver and spoofer are static with respect to each other, unlike prior art methods such as the one disclosed in U.S. Pat. No. 8,340,588 B2, cited above.

Further implementation considerations and optional aspects of embodiments of the present invention will now be described with reference to FIGS. 5-11.

Figure 5:
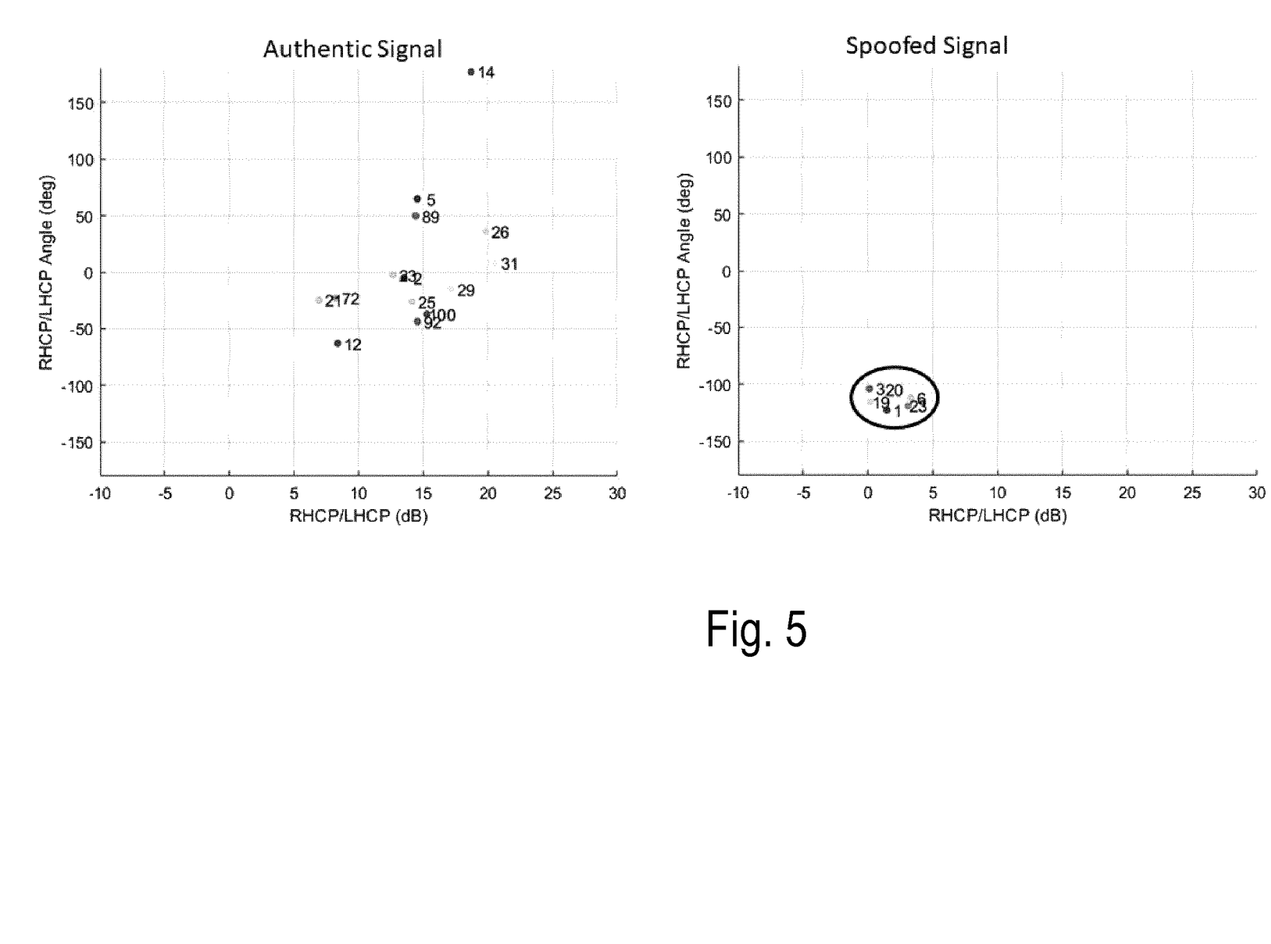
FIG. 5 represents measurements of relative amplitude and phase between two receiver chains connected to a dual polar antenna for multiple satellites at the same frequency.

If the amplitude and phase of one receive chain relative to another is monitored for each satellite in a regular situation without spoofing, using the decorrelated antenna approach as described above, the resulting values will show a two-dimensional spread due to differences in the respective propagation channels. The plot at the left in FIG. 5 shows the amplitude ratio of a dual polarized antenna on the horizontal axis (logarithmic scale), while showing the difference in phase angle on the vertical axis. Each dot represents a satellite.

A spoofing signal will propagate from the transmitter to each of the two antenna outputs via a specific, frequency-dependent propagation channel. As a result, the underlying spoofed satellite signals at a given satellite frequency (e.g. L1/E1 at 1575.42 MHz) will show the same amplitude ratio and phase difference between the two antenna outputs, characteristic for the propagation channels of the spoofer. The plot at the right in FIG. 5 represents the amplitude-phase diagram of spoofed signals in a so-called "reradiation attack". All signals are grouped together in a clustered point cloud. The point cloud could move in the diagram over time, because of time-dependent changes in the propagation channels, but it would keep containing the same satellites.

At first sight, this phenomenon could be directly exploited to detect the spoofed satellites. However, when studying the amplitude ratio and phase difference of authentic signals, it turns out that at some moments many satellites could show the same values, due to the stochastic nature of the channels. Depending on signal conditioning of the spoofing attack and the receiver implementation, the receiver may still track a mixture of authentic and spoofed signals, which would have the same signature.

An inventive insight of the inventors is that a naturally occurring cluster of authentic signals doesn't last for a long time. This is because the satellites are moving through the sky, which modifies the fading channels and antenna response. In a static environment, this holds for satellites in a non-geostationary orbit; in a dynamic environment, it holds for any satellite.

Figure 6:
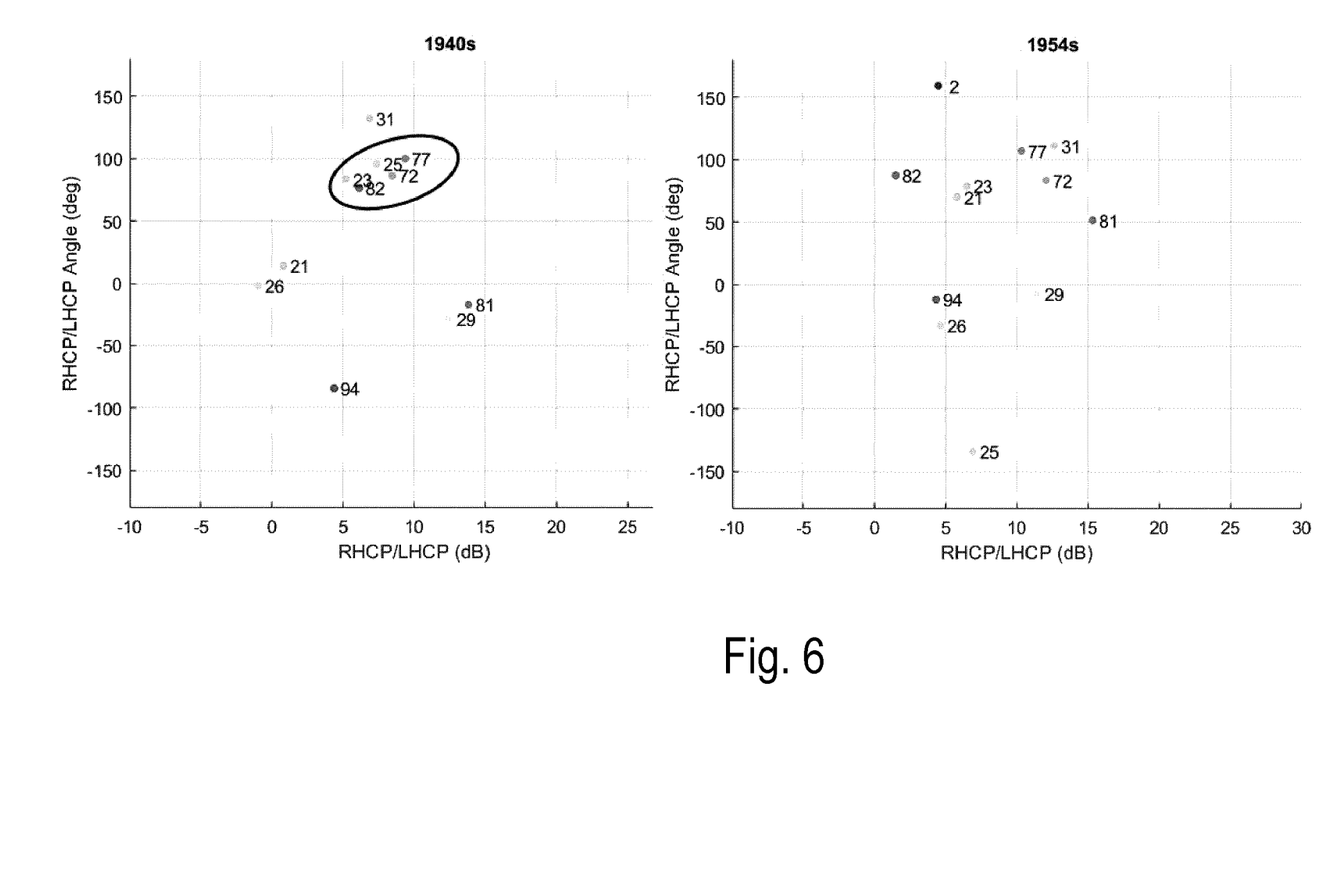
FIG. 6 represents a field recording of amplitude ratio and phase difference of dual polar antenna outputs.
Figure 7:
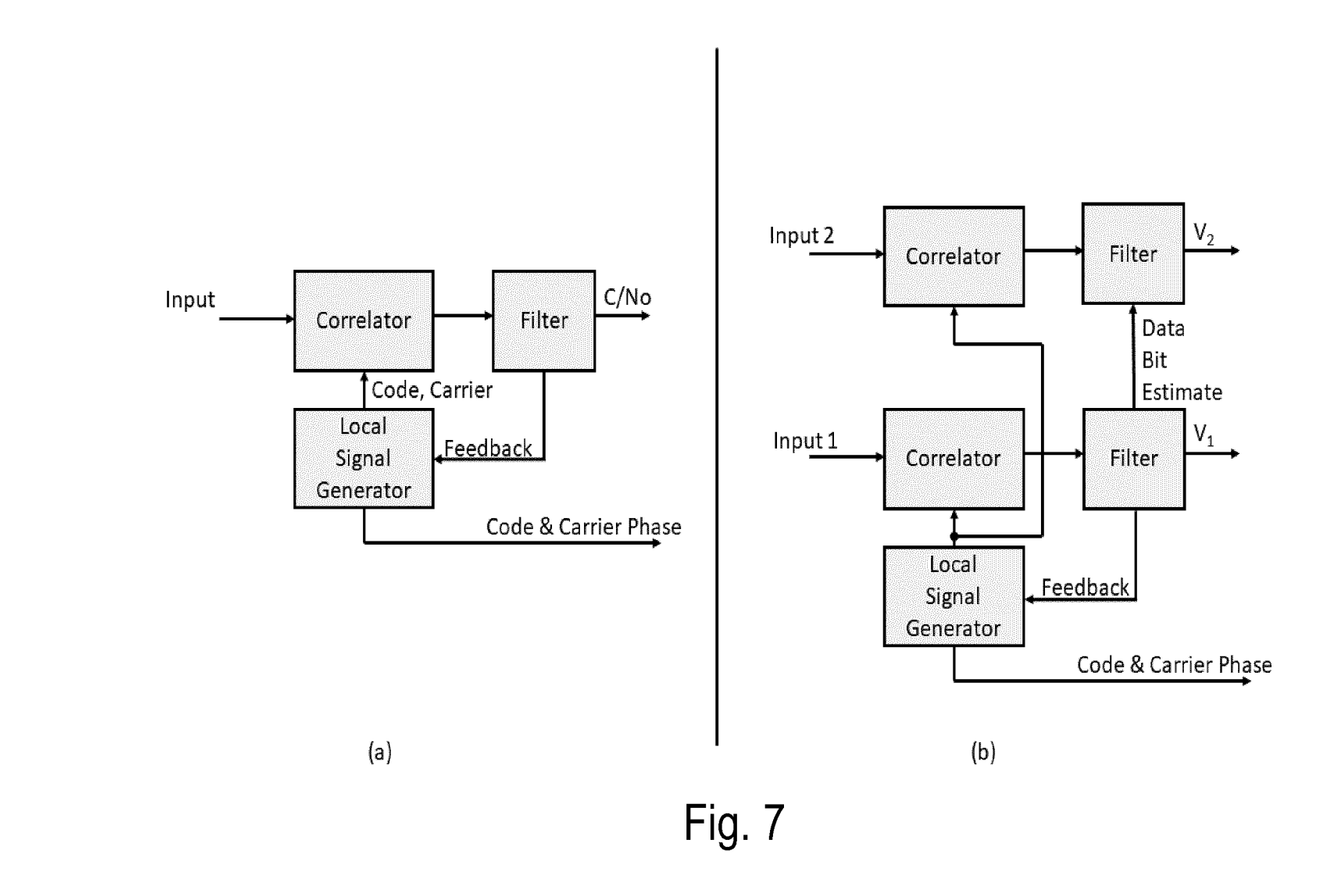
FIG. 7 schematically illustrates an exemplary tracking channel implementation.

FIG. 6 shows the measured amplitude ratio of the two antenna signals at the horizontal axis and phase difference at the vertical axis, for each satellite operating at the L1 frequency (1575.42 MHz) at a given moment of time. A dual polar antenna was used in this case for a recording under tree canopy. The plot at the left shows a cluster of satellites which have polarizations sufficiently close to each other to be consistent with a spoofing signal. However, this cluster rapidly falls apart, as is shown on the plot at the right, corresponding to the situation 14 seconds later, thus making a spoofing scenario unlikely in this case.

The size of the point-cloud under spoofing conditions is set by the noise, which is specific for each satellite. The noise relates to the measurement method of amplitude and carrier phase and to the underlying physical noise mechanism. The noise is dominated by white thermal noise if the spoofing signal is separated in time by more than one spreading chip (0.1-1 μs) from the authentic signal. Otherwise, the noise could be dominated by a cross-talk component of the authentic signal into the spoofed signal.

In a first implementation, schematically illustrated in FIG. 7(a), each receive chain would contain a standard GNSS tracking channel for each satellite signal. This channel correlates the input signal with a local replica of the carrier and pseudo-random spreading code. The resulting complex vector is filtered and used to feedback the local signal generators and to generate a carrier-to-noise (C/No) signal strength indication. The local signal generators are sampled simultaneously for all signals in one chain, providing spreading code delay and carrier phase, which are normally used to work out position and time. The C/No indication typically uses an averaging time in the order of a second, resulting in a stable reading. An accurate carrier phase is usually only available if the signal strength is sufficiently high (C/No>27 dB-Hz), but when available a stable amplitude-phase diagram can be created using the C/No difference of respective signals of each chain for the amplitude and the carrier phase difference for phase.

However, the availability of carrier phase can be an issue for permanent monitoring of the amplitude-phase diagram of the tracked satellites. The alternative implementation of FIG. 7b does not present this drawback. In that implementation, the local signals of the tracking channel in the primary receive chain which provides input to the positioning engine (usually RHCP) is used to correlate the signal in the secondary chain as well. The resulting coherent correlation values can be integrated over a long time, particularly if the uncertainty about the navigation data bits which modulate the spreading code is estimated by the primary channel and provided to the secondary channel. The preferred integration time should be at least one second. The coherent correlation corresponding to a satellite signal from the first chain is represented by a complex vector $V_1$ and similarly the respective correlation from the second chain would be $V_2$. The relative amplitude-phase diagram as in FIG. 4 could be obtained by plotting $20 \cdot \log_{10}(|V_1/V_2|)$ at the horizontal axis and $\arg(V_1/V_2)$ at the vertical axis.

The relative amplitude-phase diagram could be directly scanned for increased densities to detect clusters. This can be done in many ways. In one embodiment, clusters are detected by looking for the amplitude ratio with most satellites contained in a given interval around this ratio and a phase difference with most satellites in a given interval around this difference and consider the intersection of both satellite sets. These intervals can be identified with a stepwise sweep over the two axes, with sufficiently low granularity. The identified satellite set is then compared with a previously identified set. If both sets have 4 satellites of the same constellation in common, a stable cluster is detected and a spoofing flag could be raised. In an experimental setup, this approach has produced good results with a 3 dB amplitude-ratio interval, a 30° phase difference, a comparation time interval of 50 seconds and a correlation time in the despreading process of 1 second. The amplitude and phase axes were scanned with a granularity of respectively 0.5 dB and 5° in this case.

If thermal noise is dominant, the a-priori knowledge of the noise can be used to calculate if two points in the amplitude-phase diagram are sufficiently close together to have an identical underlying channel response, yielding a more sensitive and faster detection.

Figure 8:
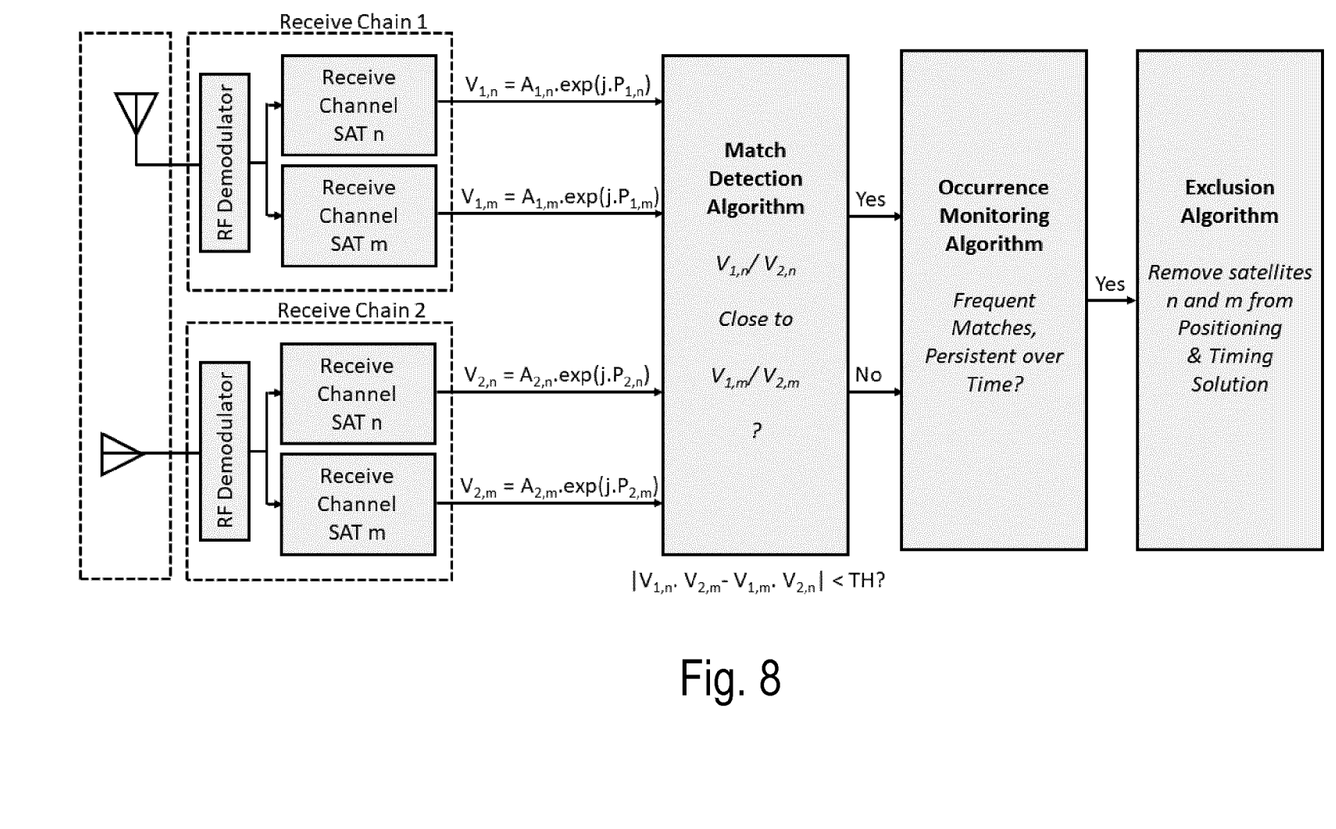
FIG. 8 provides a block diagram of an embodiment of the system according to the present invention.
Figure 9:
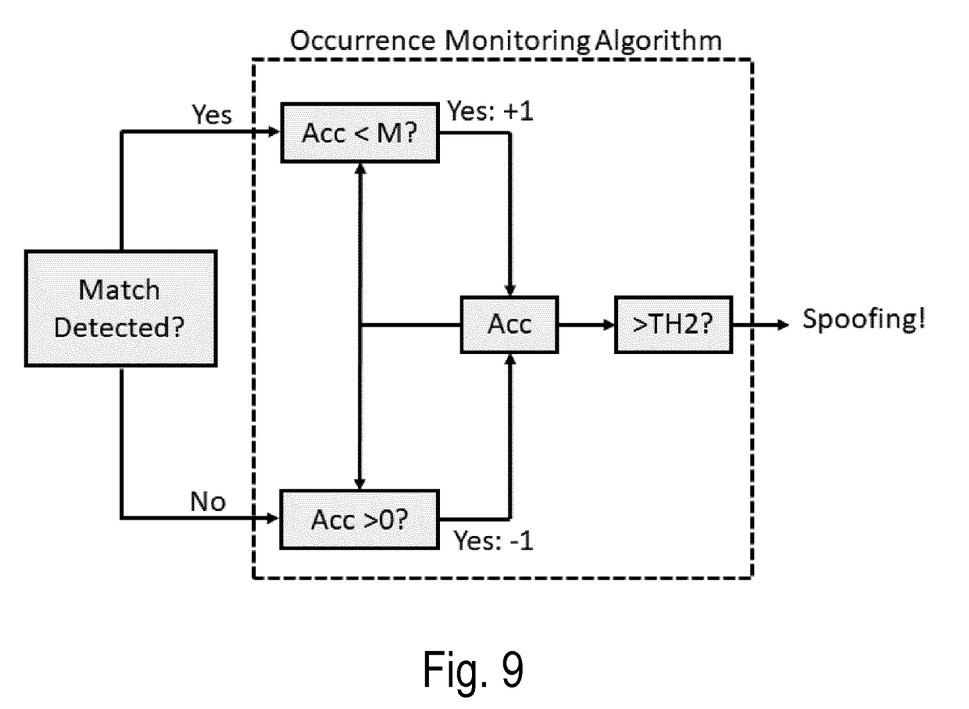
FIG. 9 schematically illustrates an occurrence monitoring algorithm for use in embodiments of the present invention.

The signal strength and phase provided by a receiver channel corresponding to satellite n in chain k can be represented by a complex vector $V_{k,n} = A_{k,n} \cdot \exp(j \cdot P_{k,n})$ as illustrated in FIG. 8. This vector is even explicitly available in some architectures, e.g. in the architecture of FIG. 7b. In the architecture of FIG. 7a, the C/No output represents the amplitude and the carrier phase measurement output the phase. To assess if amplitude ratio and phase difference between the chains are sufficiently close together, or, equivalently, if the $V_{1,n}/V_{2,n}$ and $V_{1,m}/V_{2,m}$ complex number ratios are sufficiently close for satellite pairs m, n, the difference could be compared against a fixed threshold or, more optimally, against a value related to the expected thermal noise. For instance, if the noise variance of the correlator output components are conditioned to be equal to a value $\sigma^2$, which is typically the case because of the receiver's automatic gain control, we could monitor the following condition:

$$\|V_{1,n} \cdot V_{2,m} - V_{1,m} \cdot V_{2,n}\|^2 < \text{VAR}(\|V_{1,n} \cdot V_{2,m} - V_{1,m} \cdot V_{2,n}\|) \quad \text{(Equation 1)}$$

The variance could be calculated explicitly:

$$\text{VAR}(\|V_{1,n} \cdot V_{2,m} - V_{1,m} \cdot V_{2,n}\|) = \sum_x \left(\left(\frac{\partial \|V_{1,n} \cdot V_{2,m} - V_{1,m} \cdot V_{2,n}\|}{\partial V_x}\right)^2 \cdot \text{VAR}(V_x)\right) = (V_{1,n}^2 + V_{2,n}^2 + V_{1,m}^2 + V_{2,m}^2) \cdot 2 \cdot \sigma^2 \quad \text{(Equation 2)}$$

After substitution in equation 1, we get:

$$\|V_{1,n} \cdot V_{2,m} - V_{1,m} \cdot V_{2,n}\|^2 < 2 \cdot \sigma^2 \cdot (V_{1,n}^2 + V_{2,n}^2 + V_{1,m}^2 + V_{2,m}^2) \quad \text{(Equation 3)}$$

This condition will hold in 68% of the cases in the situation in which thermal noise is dominant and satellites m and n are spoofed. Still, as pointed out earlier, the condition could also hold in case of occasional matches between two authentic signals.

To discriminate between both cases, the occurrence of matches will be evaluated over a longer time interval in the occurrence detection algorithm. This evaluation could simply count the number of positive evaluations of equation 3 in an extended time interval or in two disjoint time intervals at a given spacing and flag a spoofing event if the number of matches exceeds a given threshold value. Alternatively, it could apply a Tong detection algorithm on each pair of satellites, in which a number is incremented in case of a match and decremented in case of mismatch, with flooring and ceiling thresholds. If the number increases a given threshold value after time, a spoofing event would be flagged, allowing for example the positioning engine to discard the involved satellite pair from the position calculation. During experiments with a dual polar antenna, it was found that matching pairs of satellites decorrelate beyond noise statistics within a 30-second timeframe in most environments, including a benign environment with very limited fading. In case of the Tong algorithm, a flooring threshold of 0 and ceiling threshold of 10 provided good results with a 1 second coherent integration time.

The spoofing detection shall be inhibited if the signals of both satellites are very weak in one of the receive chains, as this results in a badly conditioned detection and a frequent positive evaluation of equation (1). When considering a dual polar antenna, this would correspond to a very pure signal polarization (for instance RHCP/LHCP>15 dB). Spoofed signals are unlikely to have a very pure polarization, as the polarization of terrestrially broadcasted signals will generally be degraded by the environment (reflection, diffraction, ground effect). A similar consideration applies to the configuration of FIG. 4b. If the signal on the linear stub element is much smaller than on the RHCP patch element, the signal must be coming from a high elevation and is hence unlikely to have been transmitted by a spoofer.

In practice, it is not known if the cross-talk noise or thermal noise will be dominant. However, multiple detection criteria as discussed above could run in parallel. The approach with direct cluster detection has a longer detection time and only works with larger sets of spoofed satellites but captures spoofing attacks in which cross-talk from authentic signals is present. This could then be complemented with the approach using equation 3 to have a more rapid detection of spoofed satellite pairs in absence of cross-talk.

The detection time and reliability can be further improved by combining cluster detection results from multiple antenna pairs or multiple GNSS frequency bands, at the expense of additional hardware. If signals from the same group of satellites happen to be clustered in the amplitude-phase diagrams of multiple antenna pairs or of multiple frequency bands, it is much less likely this is coincidental and hence a strong indication for spoofing.

It is desirable to make the user aware of the spoofing attack. Therefore, a spoofing indication can be provided to the user when one of the spoofing detection conditions discussed above are satisfied. This might as well be a spoofing probability indicator, which increases with the number of satellites which are detected to have matching relative amplitude and phase and with the time the match is sensed to be stable.

In some scenarios, it is possible to remove the spoofed satellites from the positioning solution. The Global Navigation Satellite System is broadcasting many more signals and frequencies than what's strictly necessary to compute a position. A multi-frequency, multi-constellation receiver typically receives over 50 signals, whereas just four signals are sufficient to calculate a position.

An attacker with a limited budget will generally not be able to mimic all of those signals and successfully pull them away from the authentic signals. Hence, in most cases the receiver will still be able to provide a correct position and timing after removing an affected group of signals.

However, this does not hold for re-radiation attacks in which all signals can be rebroadcasted from a wrong location. Besides, many receiver implementations only cover a subset of the signals because of reasons related to interference, certification or cost. Mitigation of the spoofing signal will be required to still provide a position in this case.

Figure 10:
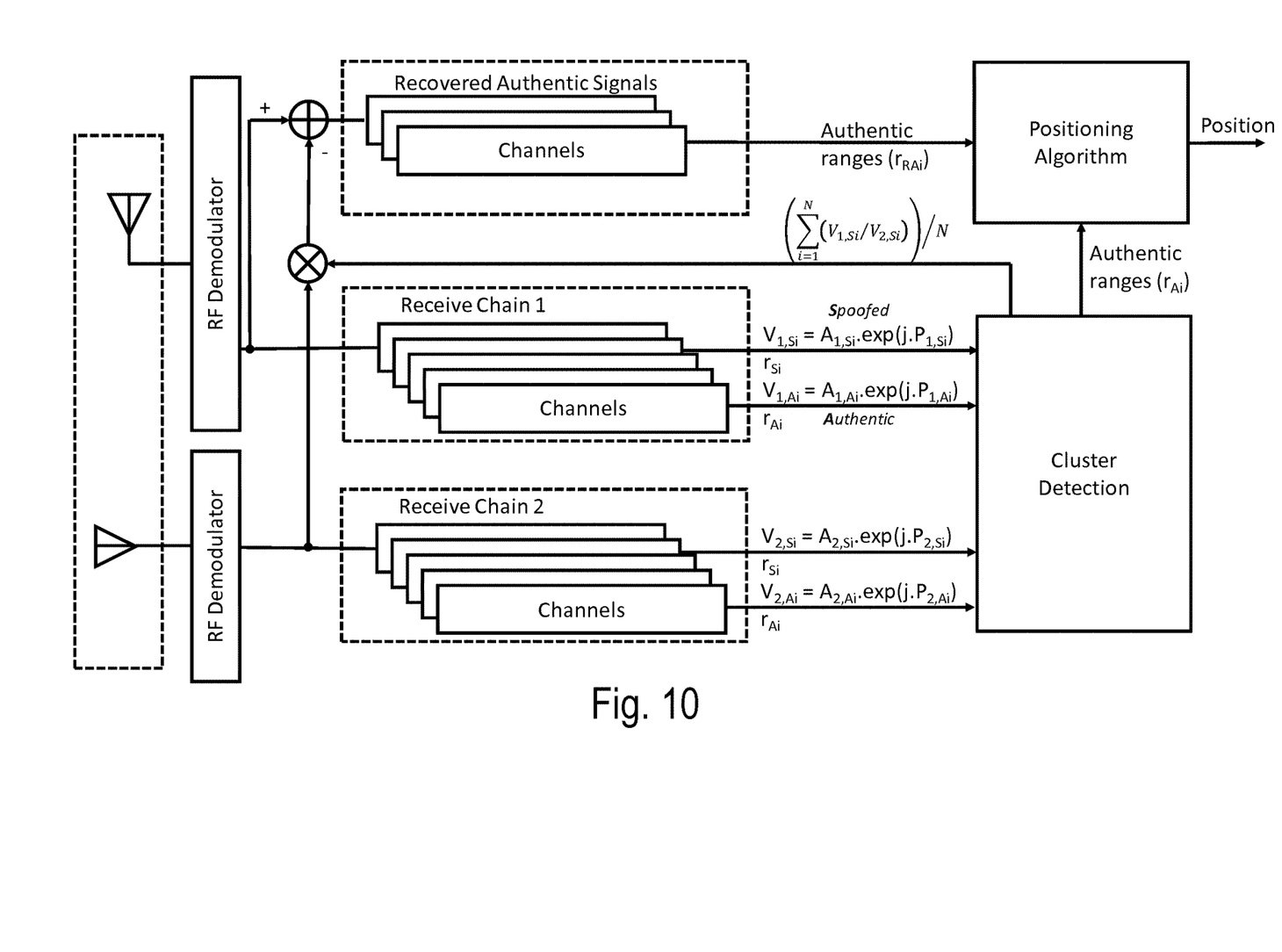
FIG. 10 schematically illustrates spoofing mitigation by input combination.

If the detected cluster is dominated by thermal noise, the authentic signal can be recovered by looking for another correlation peak (match with other spreading code chip synchronization), with a V1/V2 ratio out of the detected spoofed cluster. If cross-talk is dominant because there is less than one spreading code chip between authentic and spoofed signal, it is still possible to mitigate the spoofing signal by creating a third input signal, which is a linear combination of the other two, cancelling to zero for spoofed signals. The relative phase and amplitude ratio of the first input to the second input for spoofing signals is to be situated in the detected cluster that represents the spoofed signals. It could be approximated with an appropriate averaging metric, e.g. by averaging the amplitudes and phases of points in the cluster. If this is then multiplied with the second input signal and subtracted from the first input signal, the resulting signal will no longer contain a spoofing component. Hence, if a channel succeeds in tracking a signal from this input, it will be tracking an authentic signal. In a dual polar implementation, the LHCP input should be multiplied with the complex RHCP/LHCP ratio and subtracted from the RHCP input. This preserves the predominant RHCP nature of the authentic signals, as the LHCP component will only correspond to multipath and noise. It should be emphasized that the spoofing signal needs to be tracked permanently and that the measured amplitude and phase ratio needs to be fed back to the input with low latency to make this work. It also requires a high-speed high-resolution multiplier and adder in the signal path. This process is illustrated in FIG. 10.

Figure 11:
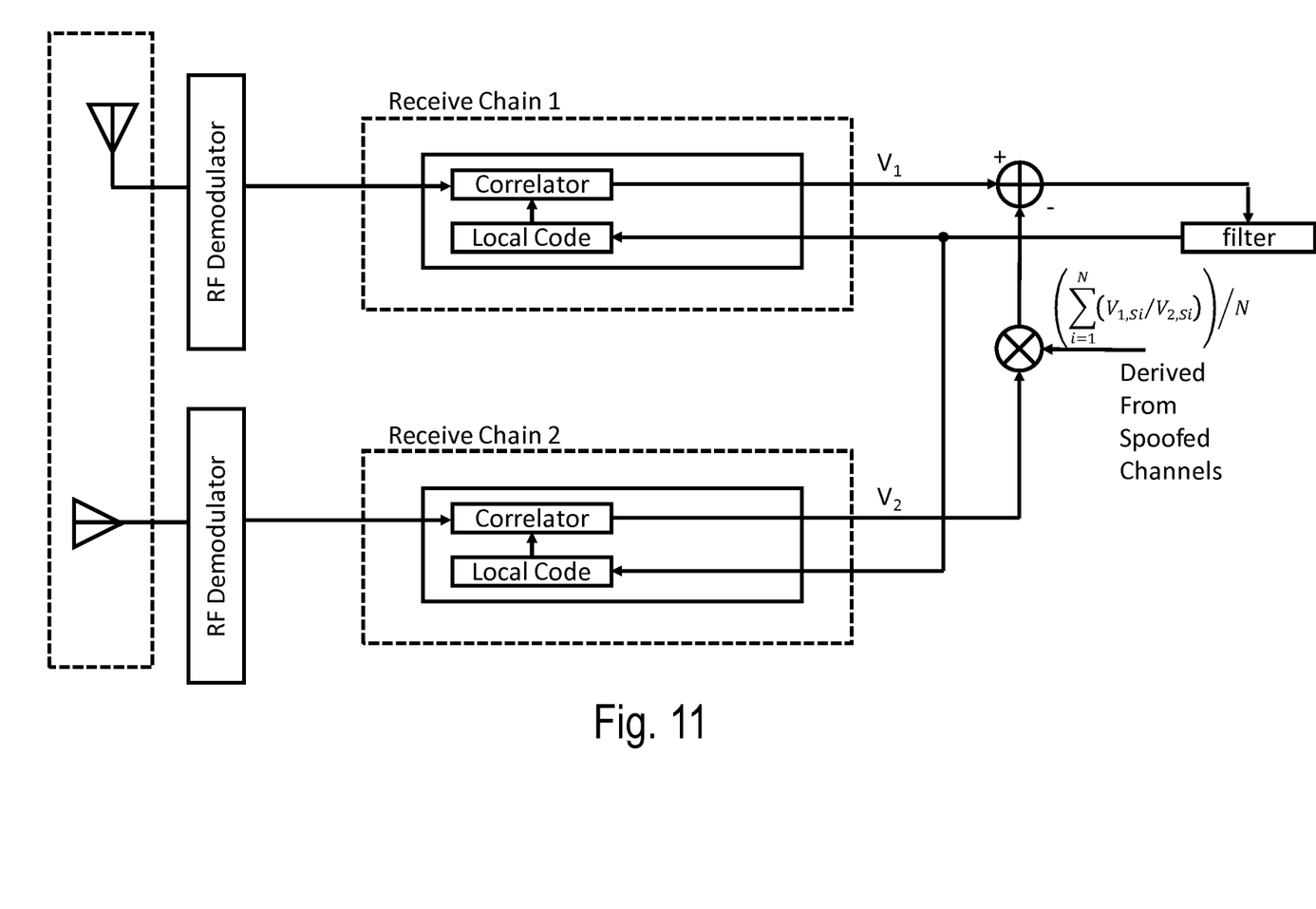
FIG. 11 schematically illustrates spoofing mitigation at correlation level.

Alternatively, with the tracking channel implementation of FIG. 7b, the linear combination can also be shifted to the level of the correlators as in FIG. 11, as a correlation is essentially a linear operation. The advantage of this implementation is that this does not require a high-speed high-resolution linear combination, which is usually not available in standard ASIC implementations. It only needs a low-speed post-correlator recombination, which can be handled by software running on a microcontroller. It however requires twice the number of channels for mitigation.

The present invention also pertains to a GNSS receiver comprising a plurality of satellite signal receive chains with a low envelope correlation coefficient, and processing means operatively connected to said satellite signal receive chains, said processing means being configured to: receive signals from said plurality of satellite signal receive chains; obtain relative amplitude and phase values of respective signals as provided by a pair of satellite signal receive chains from among said plurality of satellite signal receive chains; cluster said received signals on the basis of said monitored relative amplitude and phase values; and assert a spoofing detection state when said clustering reveals a cluster of signals exhibiting similar relative amplitude and phase values over a predetermined time frame.

All the optional features and implementation choices described above in connection with embodiments of the method according to the present invention can be applied with the same effect in embodiments of the GNSS receiver according to the present invention.

The functions attributed to the processing means of the GNSS receiver according to the present invention may be performed by programmable hardware components (e.g. general-purpose processors, DSPs, and the like) with appropriate software, configurable hardware components (e.g. FPGA), dedicated hardware components (e.g. ASIC), or any combination thereof. The same component(s) may also provide other functions.

The present invention also pertains to a computer program product comprising code means configured to cause a processor, when executed, to perform the steps of the method according to the present invention. The computer program product may, without limitation, comprise software stored on a computer-readable medium (such as an optical, magnetic, or semiconductor-based memory) or a downloadable software application.

While the invention has been described hereinabove with reference to specific embodiments, this was done to clarify and not to limit the invention, the scope of which is determined by the accompanying claims.

The invention claimed is:

1. A method for operating a Global Navigation Satellite Systems (GNSS) receiver in the presence of spoofed signals, the GNSS receiver having a plurality of satellite signal receive chains, the method comprising:
    receiving signals from said plurality of satellite signal receive chains;
    obtaining relative amplitude and phase values of respective signals as provided by a pair of satellite signal receive chains as an amplitude and phase of one receive chain relative to another from among said plurality of satellite signal receive chains;
    clustering said received signals on the basis of said obtained relative amplitude and phase values; and
    asserting a spoofing detection state in response to said clustering revealing a cluster of signals having relative amplitude and phase values that are sufficiently close together over a predetermined time frame,
    wherein said pair of satellite signal receive chains processes two orthogonal polarizations captured by a shared antenna element.

2. The method according to claim 1, further comprising providing a signal to an end user in response to said spoofing detection state being asserted.

3. The method according to claim 1, further comprising performing a position determination on the basis of said received signals, whereby signals belonging to said cluster of signals having relative amplitude and phase values that are sufficiently close together over the predetermined time frame are excluded.

4. The method according to claim 1, wherein respective corresponding signals in said pair of satellite signal receive chains are despreaded with a common local code and carrier signal, using a filtered version of a despreading result of one or both said signals to feedback a local signal timing.

5. The method according to claim 1, further comprising excluding from said clustering any signals whose relative amplitude value exceeds a predetermined threshold.

6. The method according to claim 1, further comprising producing a signal devoid of a spoofed component by performing the following steps on a first signal as provided by a first one of said pair of satellite signal receive chains and a second signal as provided by a second one of said pair of satellite signal receive chains, corresponding to said first signal:
    scaling said first signal with a relative amplitude corresponding to a point within a cluster that represents spoofed signals as detected in said asserting step;
    rotating the scaled first signal with a relative phase corresponding to said point within said cluster; and
    subtracting said scaled and rotated first signal from said second signal.

7. A Global Navigation Satellite Systems (GNSS) receiver comprising a plurality of satellite signal receive chains, a shared antenna element, and processing means operatively connected to said satellite signal receive chains, said processing means being configured to:
- receive signals from said plurality of satellite signal receive chains;
- obtain relative amplitude and phase values of respective signals as provided by a pair of satellite signal receive chains as the amplitude and phase of one receive chain relative to another from among said plurality of satellite signal receive chains;
- cluster said received signals on the basis of said obtained relative amplitude and phase values; and
- assert a spoofing detection state in response to said clustering revealing a cluster of signals having relative amplitude and phase values that are sufficiently close together over a predetermined time frame,
- wherein said pair of satellite signal receive chains is configured to processes two orthogonal polarizations captured by said shared antenna element.

8. The GNSS receiver according to claim 7, further adapted to provide a signal to an end user in response to said spoofing detection state being asserted.

9. The GNSS receiver according to claim 7, wherein said processing means is further configured to perform a position determination on the basis of said received signals, whereby signals belonging to said cluster of signals having relative amplitude and phase values that are sufficiently close together over a predetermined time frame are excluded.

10. A non-transitory computer program product comprising at least one machine-executable instruction configured to cause Global Navigation Satellite Systems (GNSS) receiver, when executed in a processor of said GNSS receiver, to perform the steps of:
- receiving signals from a plurality of satellite signal receive chains;
- obtaining relative amplitude and phase values of respective signals as provided by a pair of satellite signal receive chains as an amplitude and phase of one receive chain relative to another from among said plurality of satellite signal receive chains;
- clustering said received signals on the basis of said obtained relative amplitude and phase values; and
- asserting a spoofing detection state when said clustering reveals a cluster of signals having relative amplitude and phase values that are sufficiently close together over a predetermined time frame,
- wherein said pair of satellite signal receive chains processes two orthogonal polarizations captured by a shared antenna element.

11. The method according to claim 2, further comprising performing a position determination on the basis of said received signals, whereby signals belonging to said cluster of signals having relative amplitude and phase values that are sufficiently close together over Flail the predetermined time frame are excluded.

12. The method according to claim 2, further comprising excluding from said clustering any signals whose relative amplitude value exceeds a predetermined threshold.

13. The method according to claim 2, wherein respective corresponding signals in said pair of satellite signal receive chains are despreaded with a common local code and carrier signal, using a filtered version of a despreading result of one or both said signals to feedback a local signal timing.

14. The method according to claim 3, wherein respective corresponding signals in said pair of satellite signal receive chains are despreaded with a common local code and carrier signal, using a filtered version of a despreading result of one or both said signals to feedback a local signal timing.

15. The method according to claim 2, further comprising producing a signal devoid of a spoofed component by performing the following steps on a first signal as provided by a first one of said pair of satellite signal receive chains and a second signal as provided by a second one of said pair of satellite signal receive chains, corresponding to said first signal:
- scaling said first signal with a relative amplitude corresponding to a point within a cluster that represents spoofed signals as detected in said asserting step;
- rotating the scaled first signal with a relative phase corresponding to said point within said cluster; and
- subtracting said scaled and rotated first signal from said second signal.

16. The method according to claim 3, further comprising producing a signal devoid of a spoofed component by performing the following steps on a first signal as provided by a first one of said pair of satellite signal receive chains and a second signal as provided by a second one of said pair of satellite signal receive chains, corresponding to said first signal:
- scaling said first signal with a relative amplitude corresponding to a point within a cluster that represents spoofed signals as detected in said asserting step;
- rotating the scaled first signal with a relative phase corresponding to said point within said cluster; and
- subtracting said scaled and rotated first signal from said second signal.

17. The method according to claim 4, further comprising producing a signal devoid of a spoofed component by performing the following steps on a first signal as provided by a first one of said pair of satellite signal receive chains and a second signal as provided by a second one of said pair of satellite signal receive chains, corresponding to said first signal:
- scaling said first signal with a relative amplitude corresponding to a point within a cluster that represents spoofed signals as detected in said asserting step;
- rotating the scaled first signal with a relative phase corresponding to said point within said cluster; and
- subtracting said scaled and rotated first signal from said second signal.

18. The method according to claim 5, further comprising producing a signal devoid of a spoofed component by performing the following steps on a first signal as provided by a first one of said pair of satellite signal receive chains and a second signal as provided by a second one of said pair of satellite signal receive chains, corresponding to said first signal:
- scaling said first signal with a relative amplitude corresponding to a point within a cluster that represents spoofed signals as detected in said asserting step;
- rotating the scaled first signal with a relative phase corresponding to said point within said cluster; and
- subtracting said scaled and rotated first signal from said second signal.

19. The GNSS receiver according to claim 8, wherein said processing means is further configured to perform a position determination on the basis of said received signals, whereby signals belonging to said cluster of signals having relative amplitude and phase values that are sufficiently close together over a predetermined time frame are excluded.

* * * * *